US008171560B2

(12) United States Patent
Reus et al.

(10) Patent No.: US 8,171,560 B2
(45) Date of Patent: May 1, 2012

(54) SECURE CONTENT PRE-DISTRIBUTION TO DESIGNATED SYSTEMS

(75) Inventors: Edward F. Reus, Woodinville, WA (US); Mario C. Goertzel, Bellevue, WA (US); Michael V. Sliger, Sammamish, WA (US); Derek C. Y. Cheng, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 645 days.

(21) Appl. No.: 12/098,456

(22) Filed: Apr. 7, 2008

(65) Prior Publication Data

US 2009/0252325 A1    Oct. 8, 2009

(51) Int. Cl.
  *H04L 29/06* (2006.01)
  *H04L 9/00* (2006.01)
(52) U.S. Cl. ............ 726/26; 713/153; 380/277; 380/279
(58) Field of Classification Search .................. None
  See application file for complete search history.

(56) References Cited

U.S. PATENT DOCUMENTS

| | | | |
|---|---|---|---|
| 6,983,371 B1 | 1/2006 | Hurtado et al. | |
| 7,003,117 B2 | 2/2006 | Kacker et al. | |
| 7,162,642 B2 | 1/2007 | Schumann et al. | |
| 7,228,437 B2 | 6/2007 | Spagna et al. | |
| 7,321,660 B2 * | 1/2008 | Mont et al. | 380/277 |
| 2003/0023564 A1 | 1/2003 | Padhye et al. | |
| 2004/0068721 A1* | 4/2004 | O'Neill et al. | 717/168 |
| 2004/0139024 A1* | 7/2004 | So | 705/51 |
| 2005/0203968 A1 | 9/2005 | Dehghan et al. | |
| 2005/0203976 A1* | 9/2005 | Hyun et al. | 707/204 |
| 2005/0234828 A1 | 10/2005 | Matsuyama et al. | |
| 2007/0055982 A1 | 3/2007 | Spilo | |
| 2007/0078775 A1 | 4/2007 | Huapaya et al. | |
| 2007/0169079 A1* | 7/2007 | Keller et al. | 717/168 |
| 2007/0219915 A1* | 9/2007 | Hatano et al. | 705/57 |
| 2007/0283449 A1 | 12/2007 | Blum et al. | |

FOREIGN PATENT DOCUMENTS

WO    2004034705 A1    4/2004

OTHER PUBLICATIONS

Griwodz, "Video Protection by Partial Content Corruption", Multimedia and Security Workshop at ACM Multimedia, Bristol UK, Dated: Sep. 1998, pp. 1-4.
Ma, et al., "Content Services Network: The Architecture and Protocols", In Proc. of the 6th Intl Workshop on Web Caching and Content Distribution (WCW'01), Boston, MA, 2001, pp. 83-101.

* cited by examiner

*Primary Examiner* — Shin-Hon Chen

(57) ABSTRACT

Described is a technology by which encrypted content is pre-distributed to recipients during a pre-distribution timeframe, for example to distribute protected content to many clients in a controlled manner. At a release moment, a key for decrypting the encrypted content is released. For example, a software update may be pre-distributed in this manner, whereby many clients may receive the updates over time but the update cannot be analyzed for hacking purposes, e.g., to use the update to figure out a prior vulnerability. By rapidly and widely disseminating the key at the release moment, the update is installed on a large percentage of client systems before those systems can be exploited. The content may be allowed to expire before the key is released, or may be canceled or replaced. The content may include a complete file, and/or a delta file that changes another file into a resultant piece of content.

15 Claims, 6 Drawing Sheets

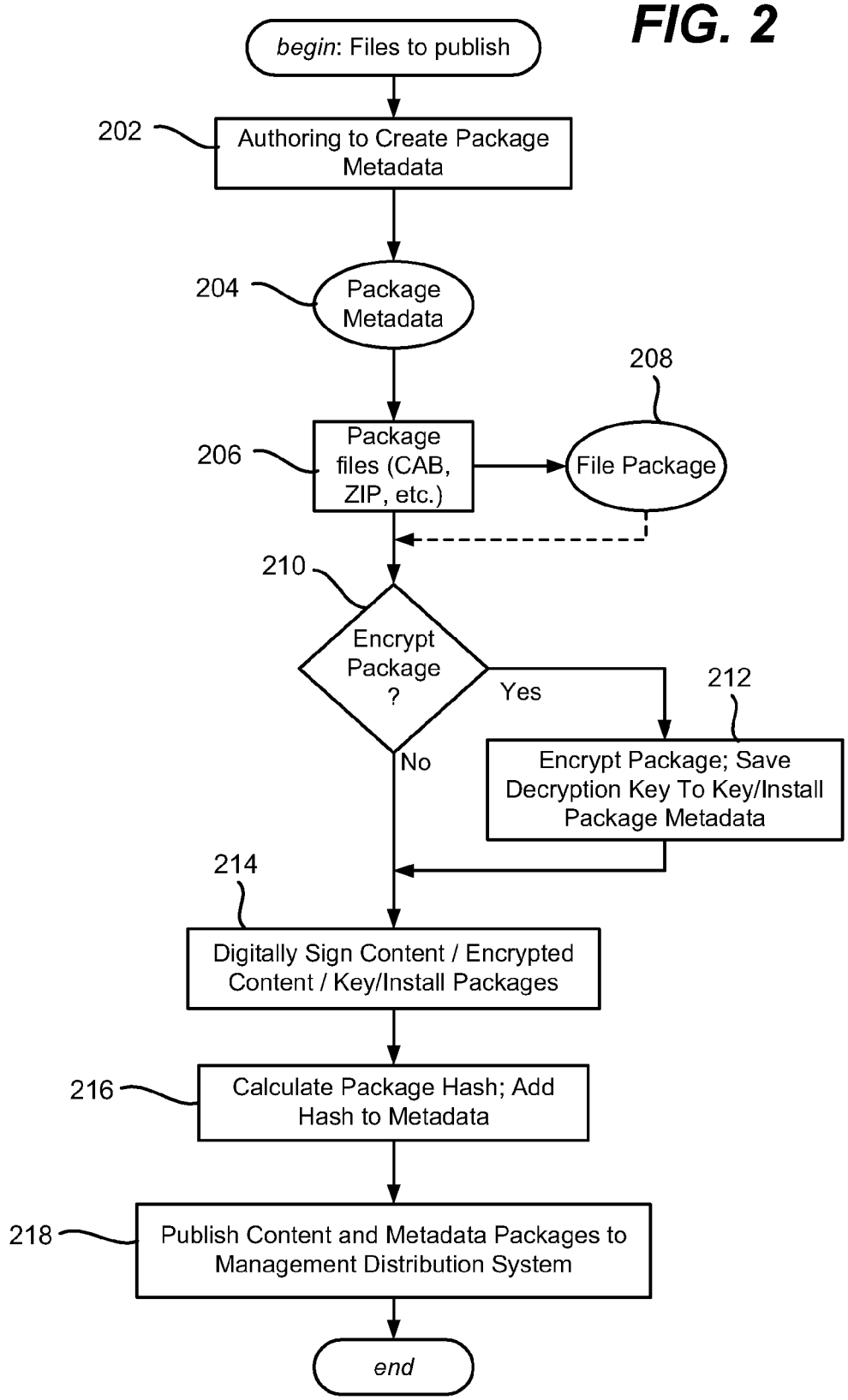

SECURE CONTENT PRE-DISTRIBUTION TO DESIGNATED SYSTEMS

BACKGROUND

Content distribution systems are fairly common in Internet and corporate (intranet) environments. One example for the Internet is Windows Update/Microsoft Update, which is used to distribute software updates for Microsoft Windows® and other Microsoft Corporation products across the Internet.

Some of this content has a sensitive nature. For example, security updates (often in the form of patches) are generally released on the second Tuesday of each month, and once released, need to be installed quickly on as many computers as possible. This is because hackers and the like are able use the security update itself as a model to understand potential security exploits that the patch fixes, and then create code that takes advantage of the vulnerability on machines that are not yet patched. Once in possession of the security fix, the time for hackers to exploit a vulnerability may be short, such as one day or less.

As one consequence, updates are made available to as many systems as possible in as short a time as possible. However, this requires a potentially huge amount of network bandwidth, as millions of clients download the updates. This can cause adverse network congestion effects across the Internet, and also leads to huge swings in network utilization depending on the day of the month. That is, huge capacity is needed, but for only a short period of time each month. Similarly, congestion can occur in a corporate environment, in which the number of systems to update is much smaller, but the network bandwidth and associated infrastructure is much smaller as well, leading to local network congestion and/or interference with business operations.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which encrypted content is distributed to recipients during a pre-distribution timeframe. At a release moment, a key package comprising information for decrypting the encrypted content for use by a client recipient is released. In this manner, for example, large amounts of content may be distributed to many clients in a generally controlled manner, but protected by keeping that content unusable until the release moment.

The content may be signed for verification purposes, and may be associated with metadata, such as to provide a hash value for further validation. For content comprising software updates, the metadata may include applicability information as to which type or types of systems the software update applies. Some or all of the metadata may be encrypted.

The content may be allowed to expire before the key is released, or may be canceled or replaced. The content may include a complete file, and/or a delta file that changes another file into a resultant piece of content. The content may be mixed with unencrypted content, and/or a distribution environment may pre-distribute both encrypted and unencrypted content, as well as distribute other content in a more conventional (e.g., not time sensitive) manner.

A recipient of the content caches it in anticipation of future use, receives the key sometime after the key release moment, and uses the key to decrypt the encrypted content into useable content. For software updates, metadata, which also may be decrypted, may be used to install the software update. Different and/or multiple keys may be received and used to decrypt different content.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which:

FIG. 2 is a flow diagram showing example steps taken to create and publish a package, including for a package containing secure content.

DETAILED DESCRIPTION

Figure 1:
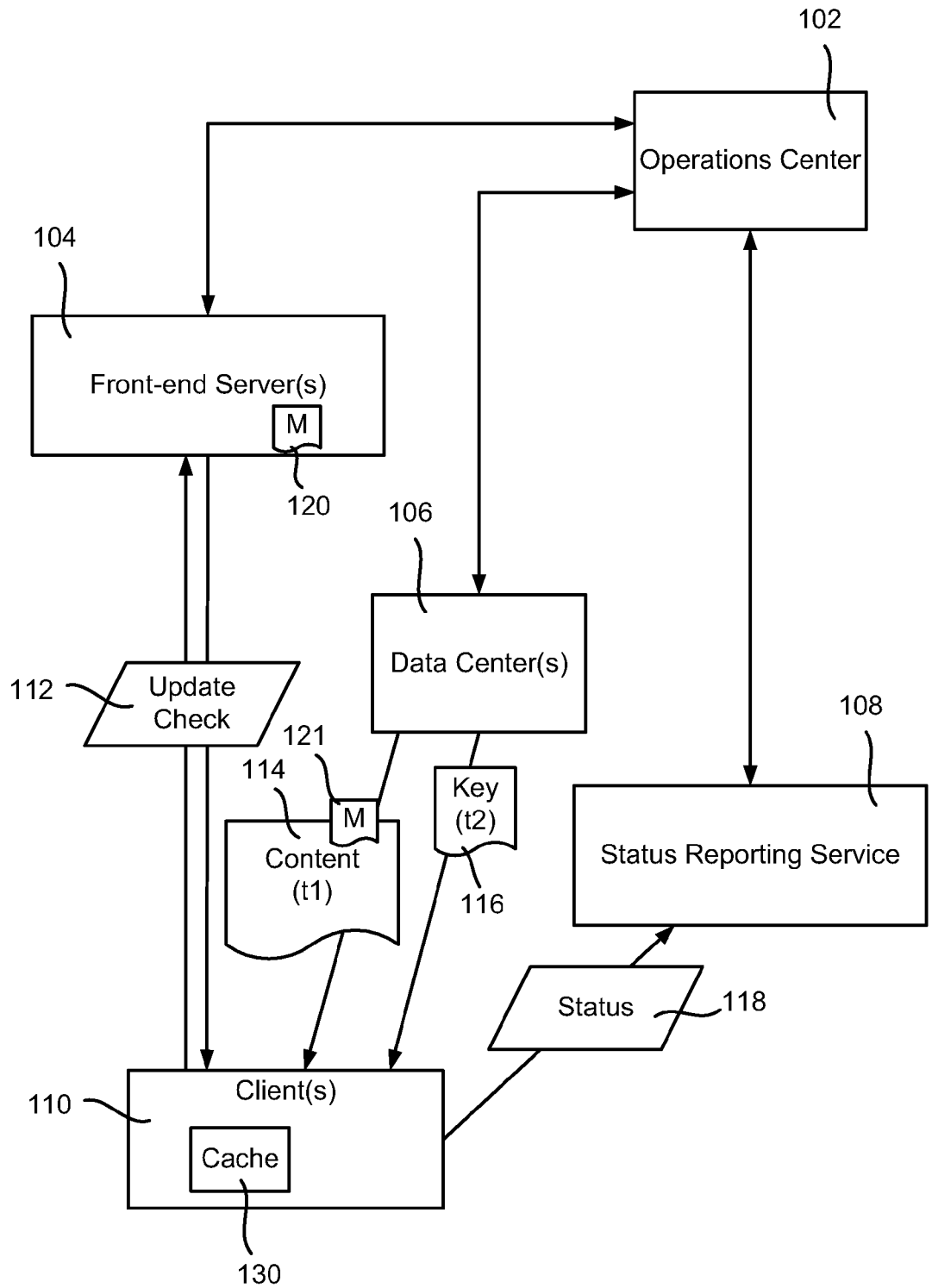
FIG. 1 is a block diagram representing an example content distribution system for securely pre-distributing content until a key-release moment.

Various aspects of the technology described herein are generally directed towards pre-distributing content to client recipients, such that the distribution is largely complete, but in which the content is encrypted and thus not able to be used until a key (or set of keys) is made available for decrypting the content. In one aspect, content corresponds to one or more software update packages, which in general are finished and tested days or weeks prior to the release, and thereby are able to be pre-distributed to client systems in anticipation of use on a targeted future release date. At a release moment, e.g., the same instant worldwide regardless of a client's time zone, a key package is made available, by which clients may decrypt, install and use the software update packages.

As can be readily appreciated, a number of advantages arise from such encrypted content pre-distribution. One such advantage is less need for bandwidth, in that updates and the like may be sent out over a longer time, in a more evenly distributed manner, rather than as a monthly spike, for example. Because the updates cannot be used until release of the key (which is relatively very small and does not consume similar bandwidth), there is no motivation for users to download the updates manually. Instead users will let automated mechanisms download the updates, whereby the distribution may be carefully controlled.

At the same time, because of the encryption, hackers cannot analyze the updates to exploit systems until they also have the key. However, because the key is generally made available to most systems at the same moment, a relatively very large percentage of systems will have the updates installed before hackers can act. This not only protects the systems that automatically download updates in advance and automatically install them when the key is released (or shortly thereafter), but removes a lot of the motivation for hackers to bother with analyzing the updates, as only a relatively small percentage of computer systems will remain available to possibly exploit.

While the examples herein are generally directed towards software distribution, it can be readily appreciated that any type of valuable or otherwise protected digital content may benefit from such pre-distribution. For example, movies, television shows, audio files (e.g., music or books on tape), electronic books, images and so forth, may be pre-distributed yet remain unusable until an appropriate key or set of keys is released. Moreover, while key-based encryption is exemplified, any other way of rendering content unusable is another form of encryption, e.g., omitting bits or bit patterns and then providing those bits along with a map of where to insert them is considered another form of encryption. Further, while the examples herein are primarily directed towards pre-distributing content and then releasing the key, alternatives are described in which the key is pre-distributed to certain systems, but the content is carefully controlled, such as to protect corporate documents until a release moment.

As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and/or content distribution in general.

Turning to FIG. 1, there is shown a general representation of a large digital content distribution system, having certain aspects similar to the structure used by Windows Update/Microsoft Update technology and other such distribution systems. As shown in such an example distribution system, different parts of the distribution system may be separated onto separate services and/or servers, including an operations center 102, front-end servers 104, data centers 106 and a status reporting service 108. As can be readily appreciated, however, these services and services may be combined onto different combinations of servers, may be further separated, and/or may reside on a single server/service. Other similar configurations also will work.

In the example of FIG. 1, content and associated metadata to be distributed are published in the operations center 102. Client systems 110 contact the distribution system (or can be contacted by the distribution system for push distributions) via the front-end servers 104, such as in a regular update check 112, in which metadata is used to evaluate new packages for the clients 110 to determine if the packages are applicable, and if so, which ones. For example, a client may provide the server with version information of its various DLLs, or the server may infer such information, and then determine what content if any is applicable to that client. Applicable content 114 is downloaded during a pre-distribution time window (or range, t1) to each client via a suitable one of the data centers 106.

However, unlike conventional distribution systems, the content 114 is encrypted and thus temporarily not useable upon distribution, at least not the content that is deemed as needing to be protected; (note that it is feasible to have a mixture of content such as different files that are encrypted and unencrypted, however in the example of FIG. 1 the content 114 represents at least the encrypted portion). Instead, at a later time t2, a key package 116 (comprising any suitable data structure including a single key or a set of keys) is made available to the clients 110 by which the clients install the content 114 (or apply configuration settings and/or make the packaged data available to other applications). Note that while FIG. 1 shows the data centers 106 as providing the key 116, numerous ways of obtaining the appropriate key 116 are feasible, some of which are described herein, including via a corporate server, a peer-to-peer connection, via a front end-server (e.g., as part of a daily update check), via email, and so forth. Indeed, with respect to security updates, the more rapidly that the key can be disseminated once the release moment occurs, the less time hackers will have before most systems can install the updates, whereby in general, the more channels of key dissemination, the better the protection.

The ability to mix conventional package distribution with pre-distributed packages may be beneficial. For example, management systems such as Microsoft Update distribute different types of software, including updates and drivers. For some packages, content pre-distribution is valuable. However for other packages pre-distribution is not necessary (although still may be performed for bandwidth considerations, even if the content need not be encrypted). For example, updates or new drivers that address non-security issues (such as a new version of a driver) do not necessarily need pre-distribution, especially if the number of target client systems is relatively small, and/or the package size is relatively small.

For completeness, FIG. 1 shows that status information 118 or the like may be sent to the status reporting service 108. For example, after installation, installation statistics are generated, such as for quality control reporting purposes to maintain update quality.

With each package such as the package of content 114 there is associated metadata describing how the client is to treat the package. The metadata (e.g., 120) may be separately accessible and/or appended to/incorporated into the package (e.g., metadata 121). This metadata 120, 121 describes its associated package's contents with enough detail to allow the intent of the package to be understood, but (to the extent possible) does not provide enough information to enable an exploit. The metadata 120, 121 may also include applicability information (e.g., what client systems are to install the package) in order for each client system to determine if the package is applicable to it.

Note that applicability rules may be intentionally general (and vague) for content pre-distribution. This is because such rules may give hints as to the area that the package will patch, particularly if the package is a security related fix or contains some other time-related content. For example, providing the specific name and version of a DLL may give a hacker a hint as to what specific part of a system is being targeted for a fix, and thus such name and version information may be omitted and an analog used (for example another DLL expected to have the same version). This may result in some packages being distributed to some systems that do not need them. To avoid improper installation attempts, packages may include additional (encrypted) applicability information that is evaluated when the key package is available; packages determined to be not needed upon processing this applicability information may be deleted, with any related information cleaned up.

Another technique is to evaluate the applicability on the remote server. The client system may be asked to send up additional information (e.g., a set of DLL names/versions) that obscure what part(s) of the system is actually being evaluated for update.

Additional metadata that can be included with the key package may include a priority level that, for example, the client may use to determine the importance of the installation, and/or the how the client system should proceed with the package. For example, if the package is a critical security patch in a consumer internet scenario, a bubble or small dialog may be displayed to encourage/recommend immediate installation by the customer (if automatic installation or install at shutdown is not enabled). In a corporate scenario, the package may be immediately installed or a time window for installation may be set (and displayed to warn the user). Less important security and other packages may use the default configuration policy for installation that is already configured on the client system.

Thus, with respect to authoring/publishing content for pre-distribution, in FIG. 1 the example may be built similar to Windows Update/Microsoft Update functionality, wherein in general, an update package comprises a metadata part (e.g., 120, 121) that describes an update and the systems to which it applies, with the update package content 114 as another part. Note that this type of infrastructure provides only one example distribution system, as content pre-distribution can be added to various other types of content distribution systems. One or more decryption keys are also provided, possibly accompanied by additional metadata.

Turning to FIG. 2, there is shown an example flow diagram comprising general steps that may be taken to publish content for pre-distribution, such as for propagating metadata 121 to front-end servers 104 and copying content to download data centers 106. Beginning with the file (or files) to publish, as represented by step 202, an authoring tool is used to create the metadata described above to create the package metadata (represented by oval 204). Some example metadata values are set forth in the following table (Table 1):

TABLE 1

| Attribute | Meaning |
| --- | --- |
| UpdateID | GUID or the like that uniquely defines the specific package. |
| RevisionNumber | Package revision number for revising an existing package. |
| UpdateType | Software, Driver, Policy set, Application Content . . . |
| InitialAvailabilityTime | Date/Time that the encrypted package will first become visible to client systems. Packages can be published before this date/time but will not be visible or available to clients until this time; even for pre-distributed packages. This is useful for server staging purposes. |
| Publisher | For example "Microsoft Corporation" |
| CanRequireUserInput | Many packages can be installed without requiring a UI; but some may require a UI wizard run at install time. |
| EULA | Some packages may require a separate End User License Agreement. |
| Title | Package Title, includes locale (can be multiple instance). |
| Description | Package Description, includes locale (can be multiple instance). |
| DefaultDescriptiveLanguage | Default language for user displayable text (packages may be localized or local specific). |
| Applicability | XML rules to evaluate on the client system to determine if the package applies to "this" system. For example, a particular update may only be applicable on Windows XP/SP2 systems and not applicable to Windows Server 2003 systems. |

TABLE 1-continued

| Attribute | Meaning |
| --- | --- |
| | Another example is that it may only be applicable to systems with MS SQL Server 2005/SP1. Multiple applicability rules may be applied and if all of them evaluate to true, then the package is applicable to that system. |
| Files | Lists one or more files or URLs that define the actual package (content) plus hash codes for each file. |

With respect to adding functionality to support package pre-distribution, at the time that the package is authored, additional metadata attributes are specified when packages are created. In one example implementation, one package is created for the pre-distribution package that holds the content (e.g., 114) to be pre-distributed, and another package is created for a key distribution package (e.g., 116) that is used to disseminate keys to client systems to enable package installation. The key/distribution package 116 is not released until the target release date, which as described above, may be a moment that is basically simultaneous worldwide, e.g., a release date/time independent of time zone considerations.

In one implementation, one example of additional package metadata that may be used in pre-distribution scenarios is set forth in Table 2 below:

TABLE 2

| Attribute | Meaning |
| --- | --- |
| PackageType | Normal, Predistribute, KeyInstall |
| ContentEncryption | None or Encrypted. |
| EncryptionMethod | Type of package encryption (example: AES_FIPS197) |
| EncryptionKeyLength | Length in bits of the decryption key. |
| EncryptionKey | Key to decrypt the package files. |
| EncryptionKeyReferenceID | In corporate scenarios where the client already has a decryption key in its key store; this attribute will reference the decryption key to use. In other scenarios that require key distribution at the TargetInstallDate, this attribute would not be specified. |
| PredistributionPackageID | If this package is of type KeyInstall, this is the package ID of the pre-distribution content package that can now be installed. |
| TargetInstallDate | Date/Time after which the package can be decrypted (if necessary) and installed. |
| ExpirationDate | Date/Time that the package will expire on if not applied. |

By way of example, a pre-distribution package has a PackageType of Predistribute (in addition to some or all of the original attributes, e.g., in Table 1). If the package is one that requires encryption, then ContentEncryption is set to Encrypted and the EncryptionMethod, EncryptionKeyLength and ExpirationDate are appropriately set. The EncryptionMethod and EncryptionKeyLength are used to provide a measure of obsolescence protection (to allow using a different encryption algorithms and/or longer encryption key lengths). By way of example, in a Windows Update/Microsoft Update scenario, the content package may be created in both encrypted and unencrypted formats. Prior to the TargetInstallDate, only the encrypted form is available for download. In the Internet hosted case, only the encrypted package is needed, because the content will be private to a specific organization.

Packages are pre-distributed in the time window between the InitialAvailabilityTime and the TargetInstallDate. The InitialAvailabilityTime (not to be confused with the TargetInstallDate) for the pre-distribution package is the date/time that the package is initially made available to distribute to client systems. When this time is reached, client systems can download and cache the pre-distribution package (generally only if applicable), however the client system will not try to install the package.

The InitialAvailabilityTime for the key/install package is the same date/time as the TargetInstallDate for pre-distribution packages that have been encrypted. The key/install package becomes available to clients once this date/time arrives and the client systems receive the decryption key, and enables clients to decrypt and install the pre-distribution package that is referenced by PreDistributionPackageID.

Note that the pre-distribution package may be available for some time (e.g., two weeks) before the target release date (TargetInstallDate). Thus, in one environment the package is encrypted using strong encryption algorithms; for example, if AES encryption is used, then a 256-bit or longer key is used, and not a 128-bit or 192-bit key). In order to protect private encryption keys, a public key system is used and not a symmetric key system; however if a symmetric key encryption algorithm is used, the use of a single-time key is recommended.

Returning to FIG. 2, the files are packaged as generally represented by step 206, using some packaging technology to create a file package (oval 208). For example the files can be combined into a CAB (cabinet) file or packaged in a ZIP file.

If the package is a pre-distribution package and needs to be encrypted as evaluated at step 210, then step 212 encrypts it and saves the decryption key to the metadata of the metadata of a key/install package. As can be readily appreciated, when it is desired to protect content from early release, the content package is strongly encrypted so that the fix is not visible until the actual key package release date. For some kinds of software packages this is optional, but for others such as security-related software changes this may be necessary to prevent malicious use.

More particularly, the key/install package is required if the pre-distribution package is encrypted, or in the case of a corporate distribution scenario, where the client does not already have a decryption key. The key/install package is used to distribute the decryption key at the target release date. If the package is not encrypted, then the client can use the TargetInstallDate to determine the date/time that the package is to be installed on the client system (although it is possible for a sophisticated user to view or install the package before that date). In a corporate example in which the client already has the key in its key store, the key to use for decryption is specified by the EncryptionKeyReferenceID.

In addition to encrypting, an encrypted package is typically signed so that clients can certify the source and integrity of the package, which when received is held within a local cache 130 (FIG. 1), such as a hard drive or an intranet network server or the like, until the target release date. Alternatively, packages may be transferred using an encrypted data channel (for example using SSL/TLS using server or dual client/server authentication) to protect them from tampering. Signing is represented via step 214, e.g., once the files are packaged, the package is signed by the publisher such as using Authenticode by Microsoft. Further, a package hash (e.g., SHA256) is calculated on the encrypted package as represented by step 216 and added to the pre-distribution package metadata. In this manner, packages that are not properly signed, are corrupt, and/or are signed by an un-trusted source, may be deleted by the client on arrival, as described below. As also described below, the package is validated again at install time to insure that the content was not modified between download and install times.

The package files and metadata are then published (step 218) to the distribution system; however the key is carefully guarded. In the example of FIG. 1, publication is to the front-end servers 104 and/or the data centers 106, however as can be readily appreciated other distribution channels may be used.

With respect to the clients, note that for Internet-based distribution system, each client needs to contact the server (e.g., a front-end server) on a regular basis, because many client systems are not reachable by the server due to network and firewall constraints. Also, it is a generally better model to secure the server and have the clients authenticate with the server, than to maintain complementary security on each of many client systems. In the case of a hosted management system with organization-specific private data, each of the clients need to be authenticated. Inside of a corporate network, the same constraints may apply, however the server may directly contact the client systems (in a push model) if desired.

Figure 3A:
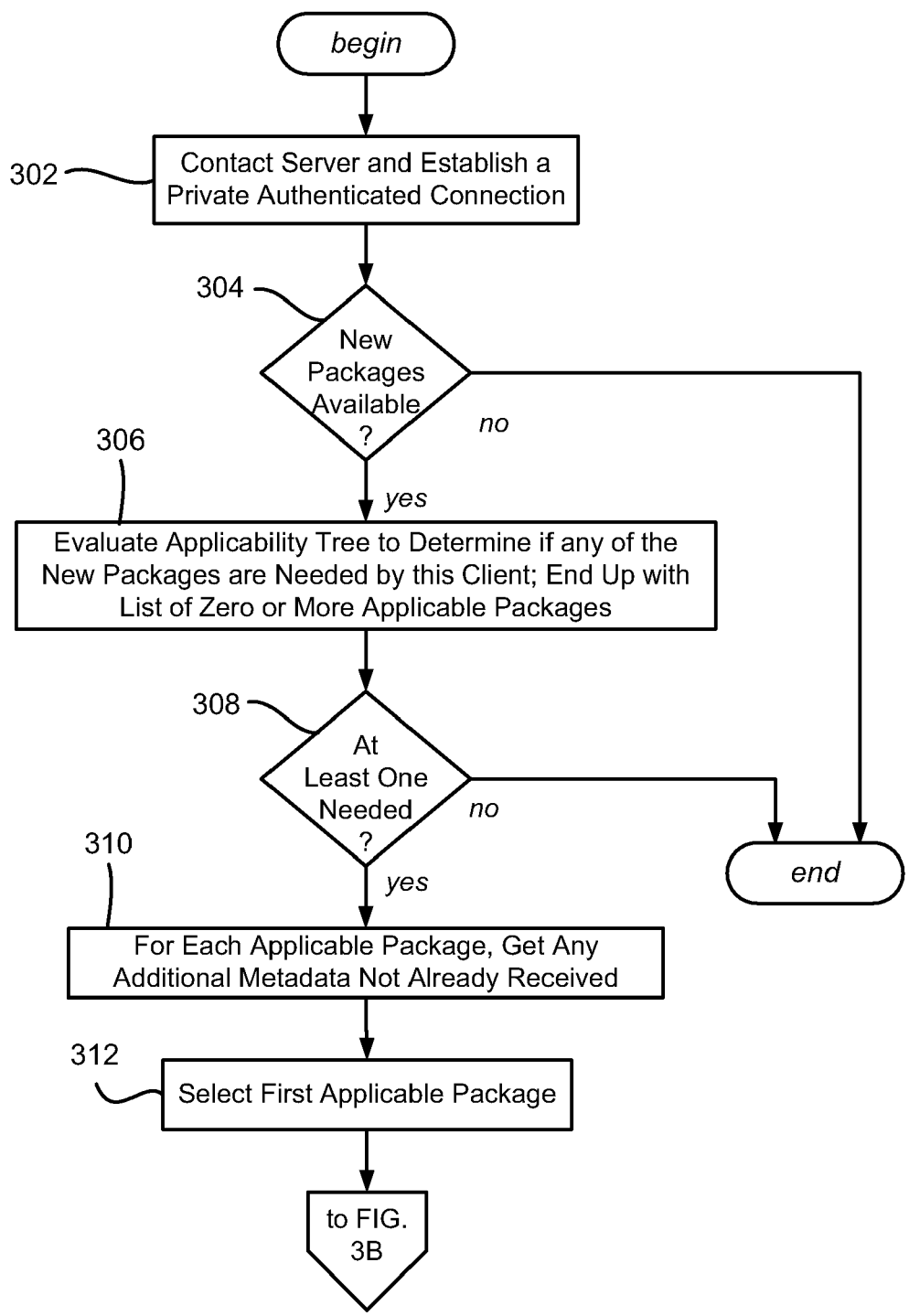
FIGS. 3A and 3B comprise a flow diagram showing example steps taken by a receiving client to evaluate and if appropriate retrieve applicable packages, including securely pre-distributed packages and key packages.
Figure 3B:
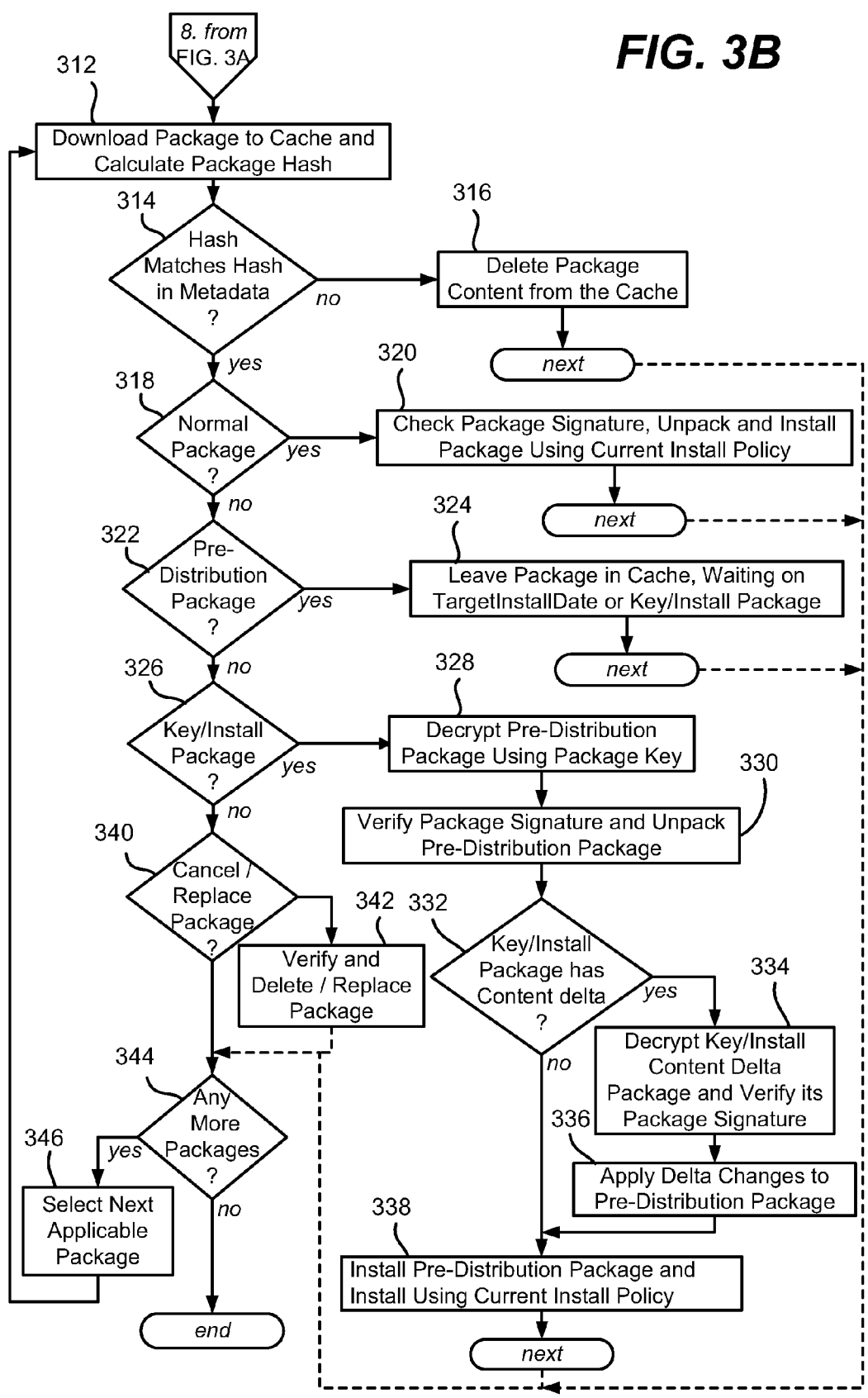

FIGS. 3A and 3B represent general, example actions that may be performed by a client system, in which at step 302 of FIG. 3A the example client system contacts the distribution server, authenticates it, and establishes a private connection. Note that client authentication can be required, such as to make content available only to authenticated subsets of client systems.

As represented by step 304, the client communicates with the server to check whether new content is available; if not, the client is done until the next check. If instead at step 304 there is new content available, then at step 306 the client evaluates information (e.g., applicability expressions, in a known manner) to determine whether any of the packages are needed, (or may be needed pending later metadata decryption as described above). In this example, a list of zero or more packages results from this determination; if the list is empty and no package is needed, step 308 ends the process for this client.

If instead at least one package is listed, at step 310 any extra metadata (title, description, hash, and so forth) is retrieved for those packages that are or may be applicable. For each package that is applicable, beginning with the first package (step 312), the example process of FIG. 3B is executed.

In the example of FIG. 3B, the package is downloaded to a local cache 130 and has its hash value calculated (step 312). Step 314 evaluates the hash of the downloaded package; if the calculated hash does not match the hash specified in the associated metadata, the package content is corrupt or has been maliciously modified, whereby the package is deleted from the cache (step 316). The process may end, or may continue (e.g., via the dashed line) to steps 344 and 346 to repeat the steps from step 312 of FIG. 3B for the next applicable package, until none remain.

If the calculated hash matches the hash from the metadata, then the correct package arrived intact and step 314 branches to step 318, which evaluates whether the package is a normal package (that is, not a pre-distribution package or a key/install package). If so, then step 320 validates the publisher's signature to verify that it is published by a publisher that this system trusts, unpacks the package and installs it according to the current install policy, which may be performed at some later scheduled time. Note that if the signature is not verified, other steps (not shown) are taken, e.g., to delete the package, prompt the user or take other actions. The process then may be repeated for any other packages, as represented by the dashed line to step 344.

If instead the package is a pre-distributed package as evaluated by step 322, the package is saved in the client cache 130 for future use. Note that if the package is not encrypted, then it will be installed at the TargetReleaseDate (as described below with reference to FIG. 4). If the package is encrypted, then it will remain in the cache until the KeyInstall package is received by which it will be decrypted and installed, or until a specified ExpirationDate arrives; (expiration is described below with reference to FIG. 5). The process may be repeated for any other packages, as represented by the dashed line to step 344.

If the various previous evaluations branch to step 326, the package is evaluated as to whether it is a KeyInstall package. If not a KeyInstall package, then the package may be a cancel or replace (substitute) package (step 340) whereby if so it is handled at step 342 to cancel or replace an existing package accordingly; (if not, then the package is of a type not handled by this example client and is not used by branching to step 344).

If a KeyInstall package, then at step 328 the pre-distribution package that it references (e.g., via the PredistributionPackageID) is decrypted, and at step 330 its publisher signature is verified and the package unpacked (assuming verification is successful; if not other actions such as deleting the package may be performed).

Note that although not explicitly shown in FIG. 3B, if at step 328 for some reason the client does not have the pre-distributed copy of the package when the key is obtained, the client may first retrieve the package. For example, the client may have been offline, or the cache may have been cleared by some means. This will likely apply to only a small percentage of client machines if enough time is given between pre-distribution and the target release date. Also note that once the target install date has arrived and the key is released, the package may be made available in an unencrypted form because the package is now public and encryption is no longer required, whereby it is not necessary to require client systems that do not yet have the package to decrypt it.

If at step 332 the KeyInstall package also contained a delta package (described below) then at step 334 that delta package is also decrypted, and its publisher signature verified. At step 336 (assuming successful verification) the pre-distribution package is updated with the changes contained in the delta package.

At step 338, the package is then installed. Steps 344 and 346 may be executed to repeat the process for other packages, if any remain, on the applicable package list.

As mentioned with reference to steps 332, 334 and 336, certain packages comprise delta packages that contain the changes to a file, such as to update a file to the latest version (rather than containing the complete new file itself. Delta files in general comprise the differences between an older version of a file and the most current desired version. For example if a file F exists in three versions ($F_1$, $F_2$, $F_3$), with $F_3$ being the most recent desirable version, then there can be a delta file containing the changes from $F_1$ to $F_3$ ($D_{1-3}$) and a delta for the changes from $F_2$ to $F_3$ ($D_{2-3}$). Delta files generally provide significant size savings, which is beneficial for client space utilization and for network utilization, e.g., delta files save network/communication bandwidth when distributing an update to existing files (as well as savings on client persistent storage space); only if the target client does not have the original file does the client need to download the full version of the file.

In a current implementation of delta files for software and content distribution, the various deltas for a given package can be held within a single file (e.g., referred to as a Master-Delta file). The file also contains a mechanism (e.g., an index) for locating a given delta for each file that is part of that package. Note that delta files are often held in a single file for simplifying management of potentially thousands of file deltas.

By way of example, in one delta compression process, the client first downloads a small package containing various metadata (an "express package") that tells the client which files are needed for the patch, as well as providing an index into the Master-Delta file. The client searches the local machine to see what is available, and then, using the metadata in the express package, determines what deltas to fetch out of the Master-Delta file. The Master-Delta file may be encrypted, however the express package also contains information that may be exploitable (for instance, which files are in the patch). If the express package is also encrypted, the client cannot figure out which (encrypted) deltas to download and cache, whereby at the release moment, the client has to download. One solution is to provide a mini-Master-Delta file, which contains the most commonly needed deltas. The mini-Master-Delta file may be encrypted and downloaded it to the client. At the release moment, clients decrypt the mini-Master-Delta file, which is sufficient to patch most clients. Some clients with uncommon configurations will need to download more deltas after the release moment.

In content pre-distribution, there is thus needed the ability to encrypt such pre-distribution data, including such delta files, because they can be used to generate the most recent file version from a previous version and thereby lead to vulnerability exploitation.

Figure 4:
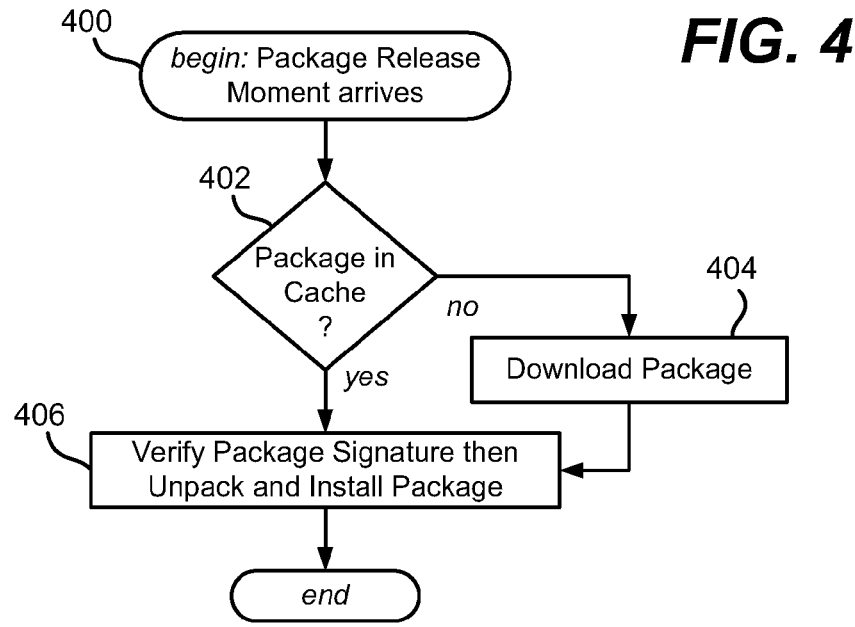
FIG. 4 is a flow diagram showing example steps taken to process a pre-distributed package at a release moment.

Turning to FIG. 4, as described above with reference to step 320 of FIG. 3, an unencrypted pre-distribution package may be installed when its TargetReleaseDate arrives. This can be done by scheduling an event in a system scheduling service, or by polling of pre-distribution packages that are currently held in the local cache on the system. To this end, as represented by step 400, when the package release moment arrives, the client system checks to see if the package is still in the cache and was not deleted. If the package (for some reason) is missing, then step 404 downloads the package. Step 406 verifies that the package was published by a publisher that the system trusts, and if so, unpacks and installs the package. Although not explicitly shown, if not verified, other actions such as to delete the package (and possibly attempt to download the proper package) may be performed.

Encrypted pre-distribution packages may be downloaded by a client, but without a Key/Install package later received on the client system. This may be intentional, such as to replace a pre-distributed package with another one; the expiration date may be extended with such a secondary distribution of content and/or metadata, again digitally signed so that any malicious change attempts can be detected and ignored.

Figure 5:
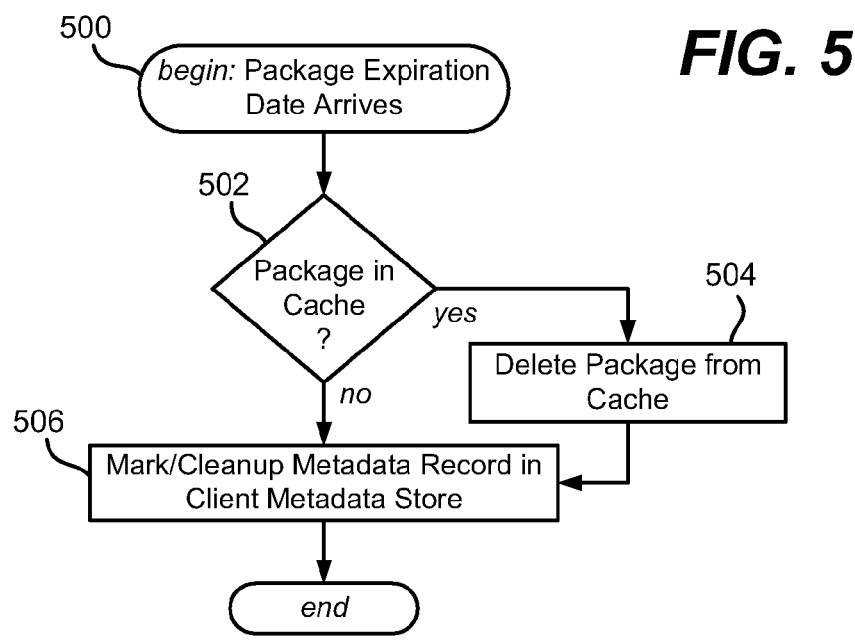
FIG. 5 is a flow diagram showing example steps taken to clean up a pre-distributed package at an expiration time.

FIG. 5 shows how a package that expires is processed, beginning at step 500 which represents reaching the date (which may be a date/time or even a moment) when the package is eventually expired, e.g., as set in the ExpirationDate metadata attribute. Package expiration may be tracked by scheduling an event for the expiration date/time in a scheduling system or by polling regularly for expired packages. Note that before expiration processing, a check may be performed to see if the Key/Install package is available; for example, it is possible the client system was offline for awhile whereby the expiration date is reached but the package is still appropriate to install.

If expired, step 502 evaluates whether the expired package is still in the cache; if so, it is deleted at step 504. Step 506 cleans up the associated metadata from the client system.

Note that any time before the expiration date, a cancel package may be distributed to the client systems to abandon the pre-distributed package. The cancel package includes metadata that identifies the content package to which it applies, and is digitally signed (or uses an encrypted channel) so that the client can verify that the sender has the authority to cancel the content package. Once the sender is verified, then the package may be deleted from the client's cache along with any other associated data in the client's data store used in maintaining the cache.

In one aspect, not only may Internet distribution be controlled via pre-distribution, but internal corporate distribution of content/software can be pre-distributed in a controlled manner to manage stress on corporate network resources. In such a scenario the package may or may not need to be encrypted.

With respect to Internet hosted and/or management systems, enterprise-specific packages that need to be made available to only agents of that organization/company, e.g., a private update, private application or private data that is hosted on an Internet facing management service may be distributed. In this scenario, the encryption of the package may use keys specific to that organization and the clients are provided with (or already have) the organization-specific decryption keys. In general, the package is intended to be always encrypted, even after the target release moment, in order to insure the privacy of proprietary applications and data. Note that this scenario may involve client and server (dual) authentication to target the packages to only those client systems that are authorized to receive the package. In this case, the client system may already have the decryption keys (as part of its membership with the company) or the decryption key can be distributed at the target release moment.

Scenarios are thus handled in which unencrypted and/or unauthenticated networks (public wireless, small company networks, and so forth) may be used, in which private content packages are distributed but still kept private. Internet-based management systems may use pre-distribution for HTTP based (non-SSL) content servers, e.g., using encryption, management systems can take advantage of third party content delivery services without making company-private SSL/TLS certificates available to the third party. In addition, remote offices can be seeded with pre-distributed content to aid with peer-caching at the remote office.

In another aspect, for some kinds of content, it may be useful to package the content in a way that multiple keys can open it, with each key providing different access. Different keys may be sent to different sets of clients (e.g., a corporate scenario, standard/premium content and so forth), and/or multiple keys can be sent to individual clients to apply to the package. For example, if the package is a video, then people given decryption "KeyA" can decrypt and see a standard version, while people given decryption "KeyA" and "KeyB" can decrypt and see a standard version and also bonus video.

Further, pre-distribution of software (and/or other content) is useful for other computation systems besides computer systems. For example, security attacks on cellular telephones and other mobile computing devices exist. Wireless connections tend to be slow with respect to downloading data, whereby content pre-distribution provides a way to trickle content out without flooding valuable network bandwidth, and/or allows distribution to be performed during off-peak network times. Note that in wireless environments and other networks where multicast is available, the package may be trickled out using multicast to save on bandwidth as well. Similarly, various embedded systems (e.g., cash register systems, automation systems and others) may benefit from such pre-distribution functionality.

Exemplary Operating Environment

Figure 6:
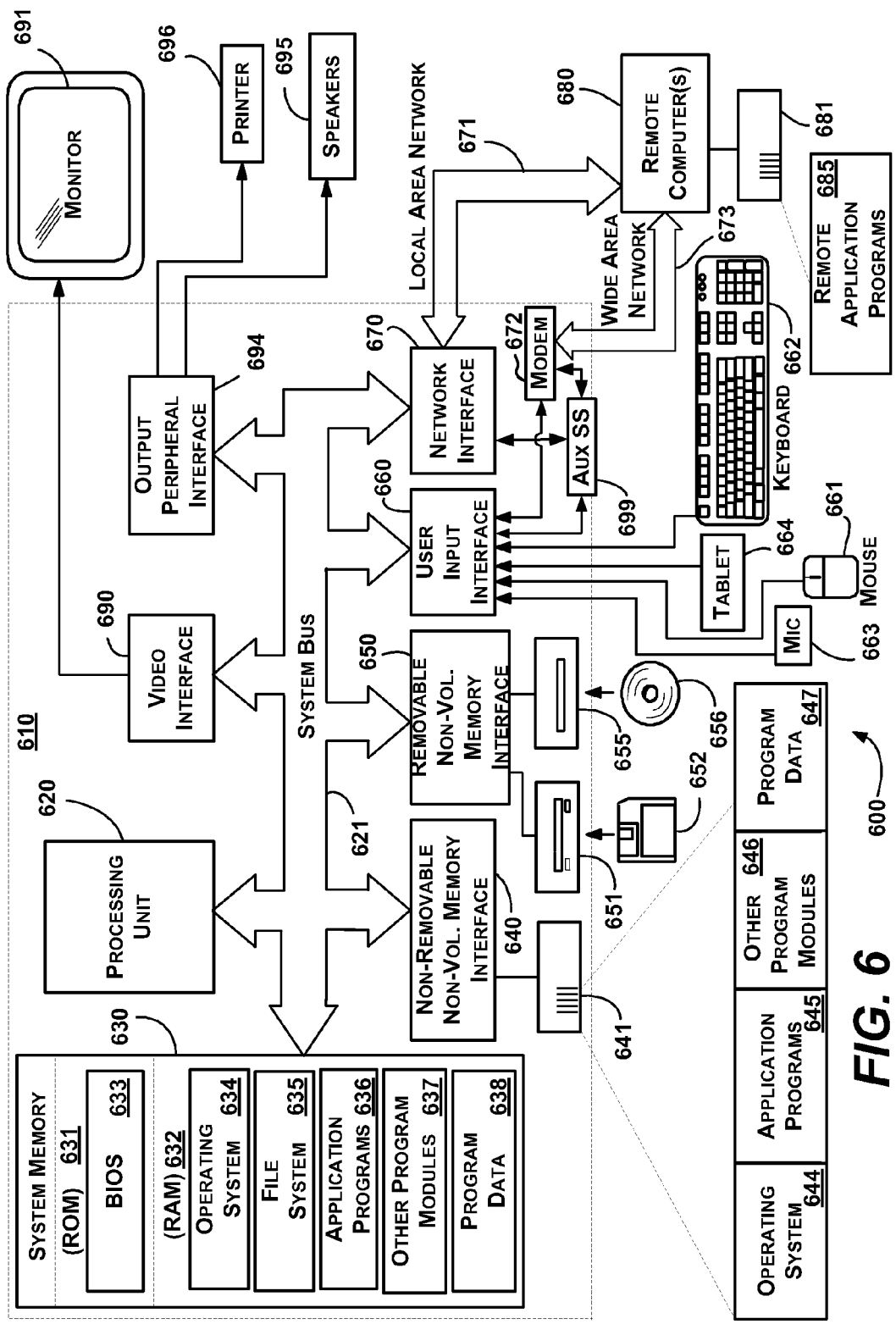
FIG. 6 shows an illustrative example of a computing environment into which various aspects of the present invention may be incorporated.

FIG. 6 illustrates an example of a suitable computing and networking environment 600 on which the examples of FIGS. 1-5 may be implemented. For example, the client system 110 of FIG. 1 may be implemented in the computer system 610, with the various servers represented by the remote computers 680. The computing system environment 600 is only one example of a suitable computing environment and is not intended to suggest any limitation as to the scope of use or functionality of the invention. Neither should the computing environment 600 be interpreted as having any dependency or requirement relating to any one or combination of components illustrated in the exemplary operating environment 600.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, embedded systems, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 6, an exemplary system for implementing various aspects of the invention may include a general purpose computing device in the form of a computer 610. Components of the computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 610 typically includes a variety of computer-readable media. Computer-readable media can be any available media that can be accessed by the computer 610 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 610. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636 and program data 637.

The computer 610 may also include other removable/non-removable, volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media, described above and illustrated in FIG. 6, provide storage of computer-readable instructions, data structures, program modules and other data for the computer 610. In FIG. 6, for example, hard disk drive 641 is illustrated as storing operating system 644, application programs 645, other program modules 646 and program data 647. Note that these components can either be the same as or different from operating system 634, application programs 635, other program modules 636, and program data 637. Operating system 644, application programs 645, other program modules 646, and program data 647 are given different numbers herein to illustrate that, at a minimum, they are different copies. A user may enter commands and information into the computer 610 through input devices such as a tablet, or electronic digitizer, 664, a microphone 663, a keyboard 662 and pointing device 661, commonly referred to as mouse, trackball or touch pad. Other input devices not shown in FIG. 6 may include a joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a video interface 690. The monitor 691 may also be integrated with a touch-screen panel or the like. Note that the monitor and/or touch screen panel can be physically coupled to a housing in which the computing device 610 is incorporated, such as in a tablet-type personal computer. In addition, computers such as the computing device 610 may also include other peripheral output devices such as speakers 695 and printer 696, which may be connected through an output peripheral interface 694 or the like.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 6. The logical connections depicted in FIG. 6 include one or more local area networks (LAN) 671 and one or more wide area networks (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660 or other appropriate mechanism. A wireless networking component 674 such as comprising an interface and antenna may be coupled through a suitable device such as an access point or peer computer to a WAN or LAN. In a networked environment, program modules depicted relative to the computer 610, or portions thereof, may be stored in the remote memory storage device. By way of example, and not limitation, FIG. 6 illustrates remote application programs 685 as residing on memory device 681. It may be appreciated that the network connections shown are exemplary and other means of establishing a communications link between the computers may be used.

An auxiliary subsystem 699 (e.g., for auxiliary display of content) may be connected via the user interface 660 to allow data such as program content, system status and event notifications to be provided to the user, even if the main portions of the computer system are in a low power state. The auxiliary subsystem 699 may be connected to the modem 672 and/or network interface 670 to allow communication between these systems while the main processing unit 620 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a digital communications environment, a method comprising:
pre-distributing encrypted content during a pre-distribution timeframe, wherein the encrypted content comprises a software update or package;
pre-distributing metadata that describes the software update or package including applicability information as to which type or types of systems the software update or package applies, wherein the metadata includes an expiration attribute corresponding to an expiration time;
making available a key package at a release moment, the key package comprising information for decrypting the encrypted content for use by a client recipient;
receiving the encrypted content, and
deleting the encrypted content if the expiration time is achieved prior to receiving the key package.

2. The method of claim 1 further comprising, digitally signing the encrypted content.

3. The method of claim 1 further comprising encrypting at least part of the metadata.

4. The method of claim 1 further comprising, distributing a cancel package prior to the release moment.

5. The method of claim 1 further comprising, distributing a replace package prior to the release moment.

6. The method of claim 1 further comprising, wherein pre-distributing the encrypted content includes distributing an encrypted delta file containing at least one change to another file.

7. In a digital communications environment, a method comprising:
receiving encrypted content during a pre-distribution timeframe;
receiving metadata associated with the encrypted content, the metadata comprising a hash of the content, wherein the metadata further includes an expiration attribute corresponding to an expiration time, wherein the encrypted content comprises a software update or package, and the received metadata further describing the software update or package including applicability information as to which type or types of systems the software update or package applies, and using at least some information in the metadata to install the software update or package;
caching the encrypted content in anticipation of future use;
calculating a hash of the received encrypted content;
determining whether the calculated hash matches the received hash;
if the calculated hash does not match the received hash, deleting the cached encrypted content; and
if the calculated hash does match the received hash:
receiving a key after a key release moment; and
decrypting the encrypted content via the key into useable content; and
deleting the cached encrypted content if the expiration time is achieved prior to receiving the key.

8. The method of claim 7 further comprising decrypting at least some of the metadata.

9. The method of claim 7 wherein the encrypted content comprises delta content, and further comprising, decrypting the delta content and using the delta content to change another piece of content.

10. The method of claim 7 further comprising receiving another key, and further comprising, using the other key to decrypt other content.

11. The method of claim 7 further comprising replacing cached encrypted content.

12. One or more computer storage media, the computer storage media not consisting of a propagating signal, the computer storage media having computer-executable instructions, which when executed perform steps, comprising:
encrypting software data;
including the software data in a signed content package;
distributing the software data during a pre-distribution timeframe;
providing metadata associated with the software data, the metadata describes the software update including applicability information as to which type or types of systems the software update applies, wherein the metadata includes an expiration attribute corresponding to an expiration time;
determining whether the software data is to be made available for use by recipients, and if so, releasing a key package at a release moment for use in decrypting the software data into useable software data;
providing an expiration mechanism that expires the software data if determined that the software data is not to be made available for use;
receiving the encrypted software data, and
deleting the encrypted software data if the expiration time is achieved prior to receiving the key package.

13. The one or more computer storage media of claim 12 having further computer-executable instructions comprising, determining whether the software data is to be canceled or replaced during the pre-distribution timeframe, and if so, distributing a package to cancel or replace the software data, respectively.

14. The one or more computer storage media of claim 12 wherein providing the metadata associated with the software data further comprises providing information corresponding to a hash of the software data.

15. The one or more computer storage media of claim 12 wherein the content package, the metadata, or the key package, or any combination of the content package, the metadata, or the key package includes a delta file for modifying another piece of content.

* * * * *